Oct. 30, 1962 P. H. WECHSLER 3,060,477

APPARATUS FOR REMOVING PHONOGRAPH RECORD LABELS

Filed Nov. 5, 1957 5 Sheets-Sheet 1

INVENTOR,
PAUL H. WECHSLER

BY Lyon & Lyon

ATTORNEYS

APPARATUS FOR REMOVING PHONOGRAPH RECORD LABELS

Filed Nov. 5, 1957

INVENTOR,
PAUL H. WECHSLER

BY Lyon & Lyon
ATTORNEYS

APPARATUS FOR REMOVING PHONOGRAPH RECORD LABELS

Filed Nov. 5, 1957 5 Sheets-Sheet 3

INVENTOR,
PAUL H. WECHSLER

BY Lyon & Lyon

ATTORNEYS

Oct. 30, 1962 P. H. WECHSLER 3,060,477

APPARATUS FOR REMOVING PHONOGRAPH RECORD LABELS

Filed Nov. 5, 1957 5 Sheets-Sheet 4

INVENTOR,
PAUL H. WECHSLER

BY Lyon & Lyon

ATTORNEYS

APPARATUS FOR REMOVING PHONOGRAPH RECORD LABELS

Filed Nov. 5, 1957 5 Sheets-Sheet 5

INVENTOR,
PAUL H. WECHSLER
BY Lyon & Lyon
ATTORNEYS

1

3,060,477

APPARATUS FOR REMOVING PHONOGRAPH RECORD LABELS

Paul H. Wechsler, Scranton, Pa., assignor to Capitol Records, Inc., Los Angeles, Calif., a corporation of California Filed Nov. 5, 1957, Ser. No. 694,602
2 Claims. (Cl. 15—77)

This invention relates to the phonograph record art and has particular reference to apparatus for removing the paper labels from plastic phonograph records.

The bulk of the present day phonograph records are made of a thermoplastic material such as a vinyl copolymer and are provided with annular paper labels on the center driving area of the record on both side thereof. Large quantities of these records are produced which are utimately never sold due to obsolescene of the recorded material, such as popular songs and the like. It has been the practice to salvage as much of the relatively expensive thermoplastic material of such obsolete records as possible for re-molding into new records. Heretofore, due to the impracticability of removing the paper labels from the center sections, it has been the practice to punch the label area from the remainder of the record, leaving only the annular grooved portion of the record suitable for re-use in making new records. The punched-out label sections were sold as scrap at a much lower cost than the label-free grooved portions, for use in low quality molded goods where the presence of a substantial amount of paper as a filler could be tolerated.

One of the principal objects of the present invention is, therefore, to provide apparatus whereby the labels may be removed from phonograph records in an economical manner so as the permit the salvaging of substantially the entire plastics portions of the records.

Another object of this invention is to provide a wholly automatic machine for the removal of paper labels from plastic phonograph records.

Other objects and advantages of the present invention it is believed will be readily apparent from the following detailed description of a preferred embodiment thereof when read in connection with the accompanying drawings:

In the drawings:

FIG. 3 is a sectional elevation taken substantially on the line 3—3 of FIG. 1.

Briefly, this invention comprehends within its scope the discovery that the paper labels of plastic phonograph records can be completely removed, without removal of any substantial portion of the plastic material of the records themselves, by softening the labels with water or some other liquid which is a non-solvent for the plastic, and then subjecting the label areas to the abrasive action of wire brushes revolving at a speed sufficiently high to abrade, tear and remove the labels, but sufficiently low to avoid damage to or removal of the plastic material. The apparatus of the present invention includes means for automatically feeding records, one-by-one, through the bites between cooperating pairs of wire brushes, and means for washing and drying the de-labeled records.

2

Figure 1:
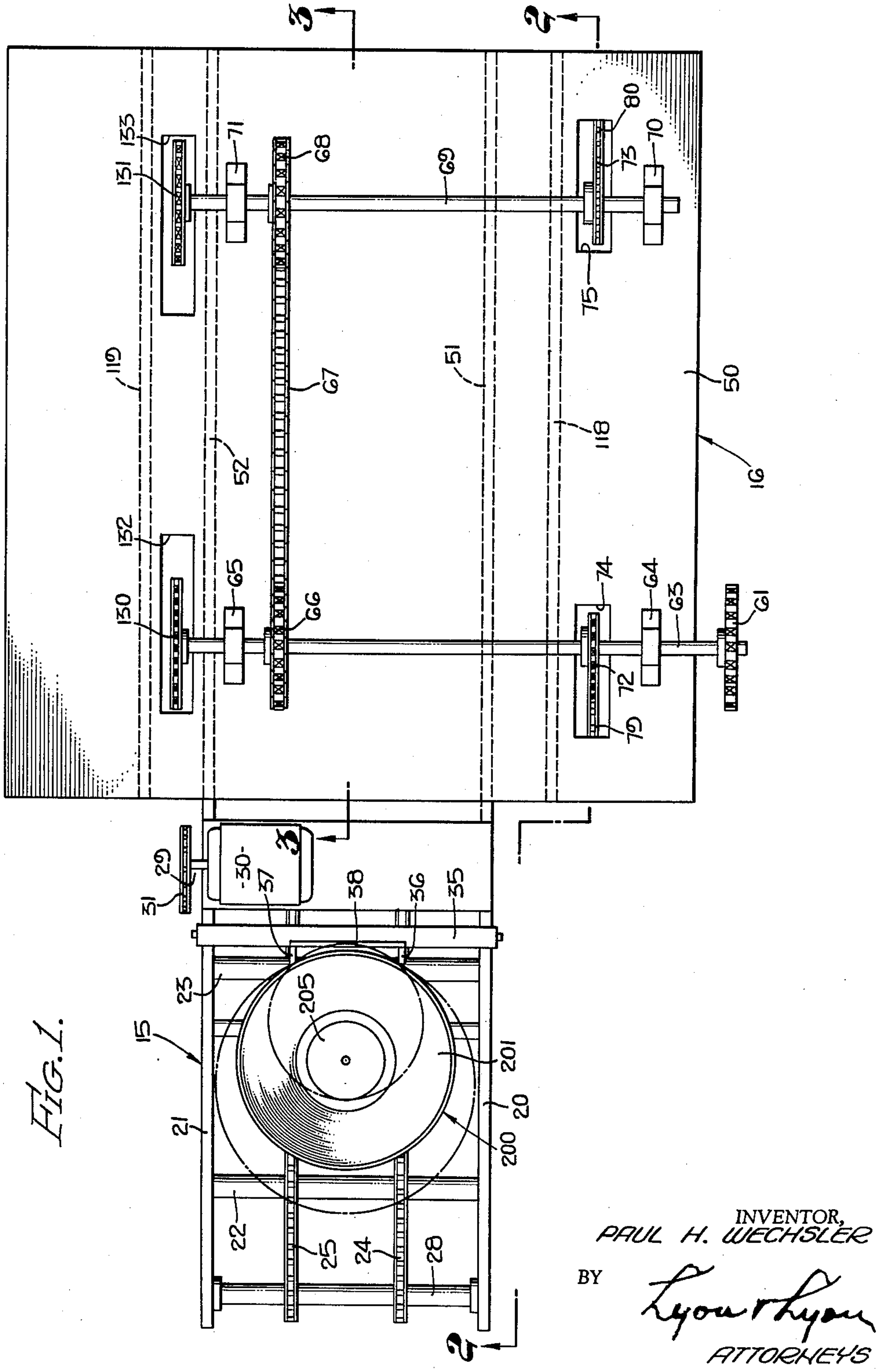
FIG. 1 is a top plan view of a machine embodying the invention.

Referring now to the drawings, the apparatus of the present invention comprises a record feeding unit generally indicated 15, and a de-labeling unit generally indicated 16. The feeding unit 15 includes a pair of side plates 20 and 21, rigidly connected to the de-labeling unit, the plates being maintained in the spaced parallel relationship shown by means of a pair of cross-bars 22 and 23. A pair of endless chain convenyors 24 and 25 are positioned between the plates 20 and 21, the sprockets 26 and 27 for the conveyors being carried on shafts 28 and 29, respectively. The conveyors are driven so that the upper runs thereof move to the right as seen in FIG. 1 and FIG. 2, by means of a motor 30 and chain transmission 31 which includes a driven sprocket 32 keyed to the shaft 29.

A bracket member 35 extends transversely between and is secured to the plates 20 and 21 adjacent the discharge ends of the conveyors. Supported on the bracket member is a pair of upright, spaced stop members 36 and 37 connected at the tops thereof by a cross-bar 38. From an inspection of FIG. 2 it will be apparent that the lowermost portions of the stop members are spaced above a plane defined by the upper surfaces of the upper runs of the conveyors 24 and 25, the spacing being slightly greater than the thickness of a conventional phonograph record, but less than the thickness of two such records stacked in superimposed relation.

Figures 2, 7:
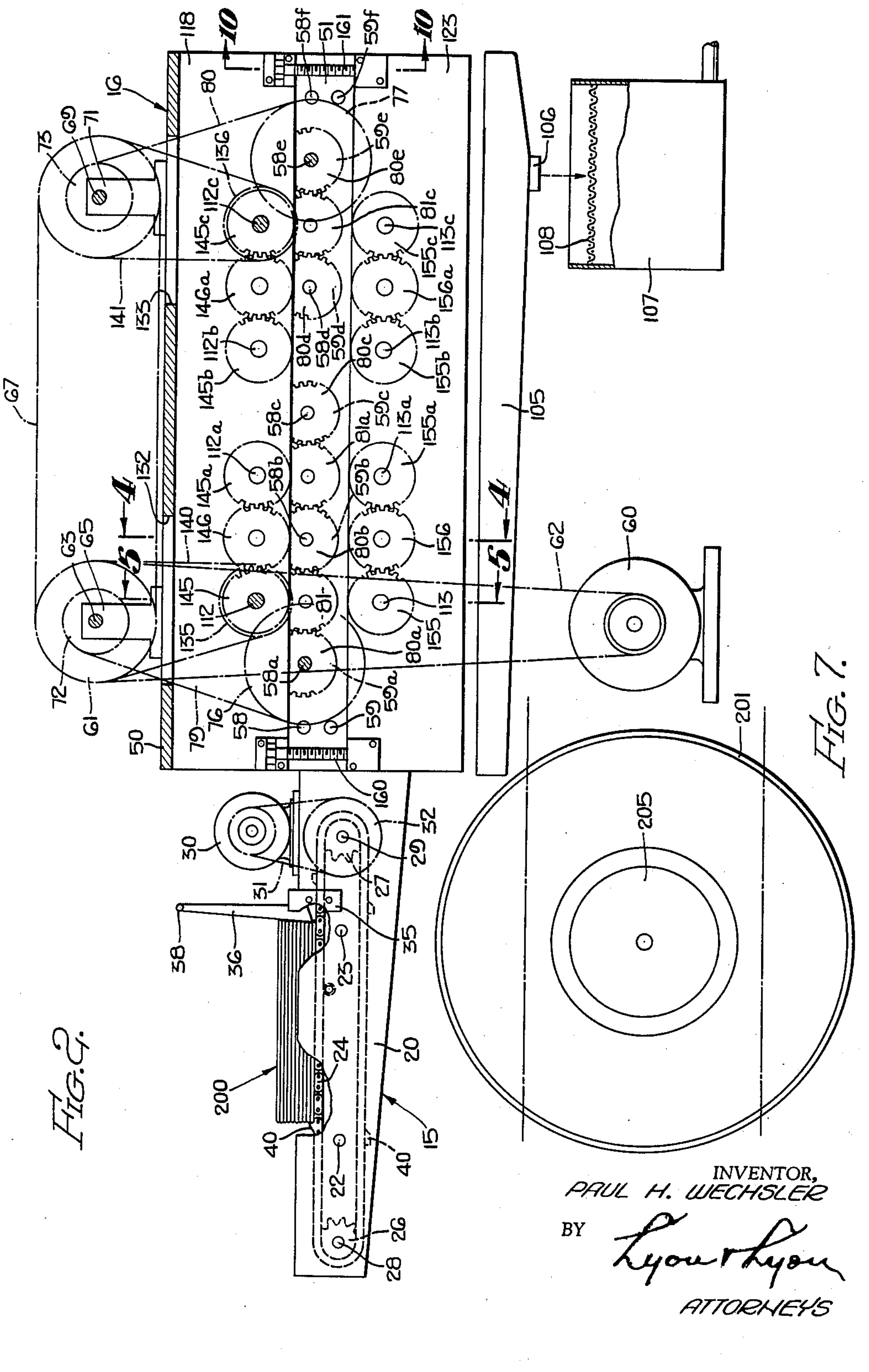
FIG. 2 is a section elevation taken substantially on the line 2—2 of FIG. 1.
FIG. 7 is a top plan view of a conventional phonograph record, illustrating in phantom lines the path of travel of the wire wheel brushes.
Figure 5:
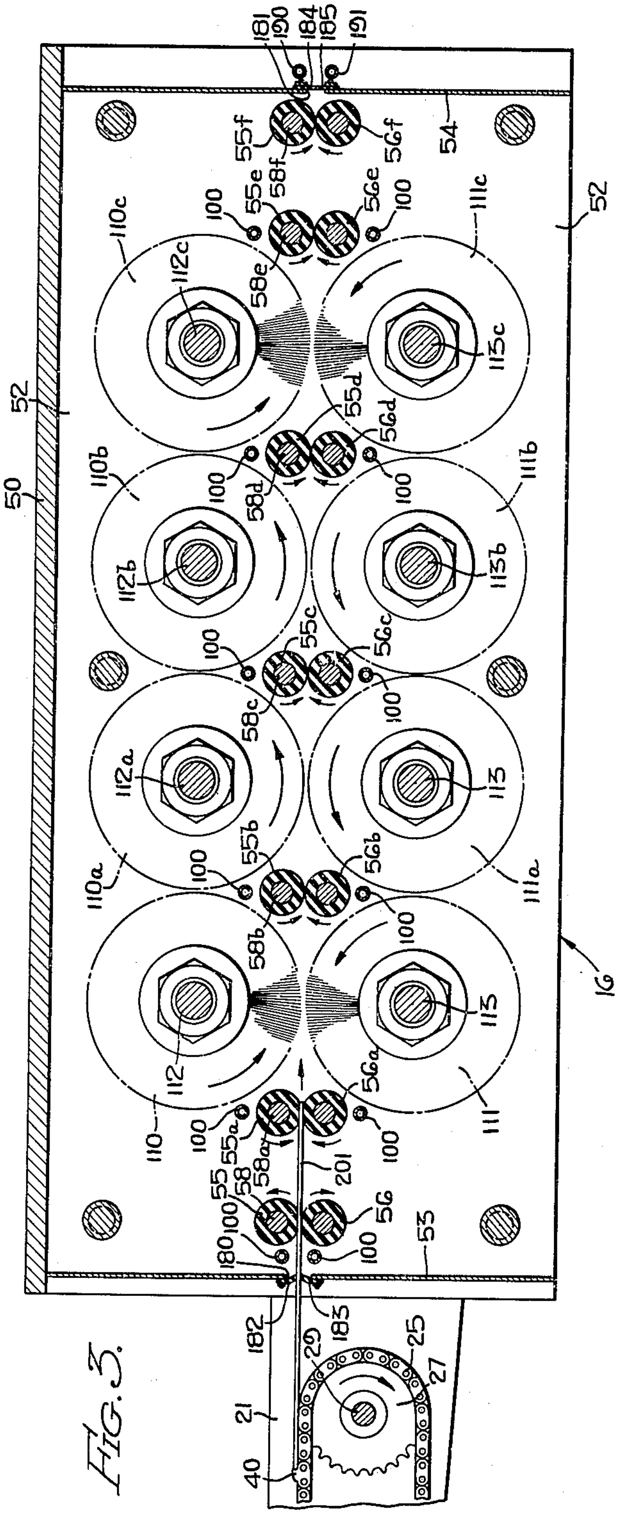
FIG. 5 is a sectional view taken substantially on the line 5—5 of FIG. 2.

Record engaging means are provided on the conveyors 24 and 25, and as shown in FIG. 2 of the drawings, these means may include a plurality of pairs of hook members 40 secured to the chains of the conveyors and projecting upwardly therefrom. The overall vertical dimension of the projecting portion of each such hook member is slightly less than the thickness of a single conventional phonograph record. The hook members on the two conveyors are transversely aligned and the hook members of each conveyor are spaced apart a distance at least slightly greater than the diameter of the records being operated upon.

The de-labeling unit 16 includes a housing comprising a top wall 50, side walls 51 and 52 and end walls 53 and 54, all supported upon a suitable framework (not shown). Means are provided for conveying individual records longitudinally through the housing and as shown in the drawings these means may include a plurality of pairs of rubber driving rolls 55–55*f* and 56–56*f*, the rolls of each pair being axially aligned in a common vertical plane and cooperating together to form a bite between which the records are pulled. The rolls are mounted on shafts 58–58*f* and 59–59*f* extending through apertures in the side walls 51 and 52, bearings 58A and 59A being therein provided.

Means are provided for driving the rolls in the directions of the arows in FIG. 3 and at a peripheral speed of about 20 feet per minute so that the records are conveyed through the housing at this approximate lineal speed. As shown in the drawings, these means include a motor 60 which drives a sprocket 61 through a suitable chain transmission 62. The sprocket 61 is keyed to a shaft 63 journalled in bearing brackets 64 and 65. Also keyed to the shaft is a sprocket 66 connected by means of a chain transmission 67 to a sprocket 68 keyed to a second shaft 69 journalled in bearing brackets 70 and 71. Keyed to the shafts 63 and 69 are a pair of identical, relatively small diameter sprockets 72 and 73 operating above openings 74 and 75 in the top wall 50, these sprockets being connected to relatively large diameter sprockets 76 and 77 respectively through chain transmissions 79 and 80. The sprockets 76 and 77 are connected to one end of each of the roller shafts **58*a* and 58*e***.

A driving gear **80*a* is keyed to the shaft 58*a*, and a gear 80*e* is keyed to the shaft 58*e*. The gear 80*a* is engaged with an idler gear 81 which in turn is engaged with a gear 80*b* on the shaft 58*b*, the gear 80*b* being engaged with a second idler gear 81*a* which in turn is engaged with a gear 80*c* on the shaft 58*c*. The gear 80*e* is engaged with an idler gear 81*c* which in turn is engaged with a gear 80*d* on the shaft 58*d*. It will be understood that the train of gears thus described causes the rolls 55*a*–55*e*** to be rotated simultaneously in the directions indicated in FIG. 3.

Figure 9:
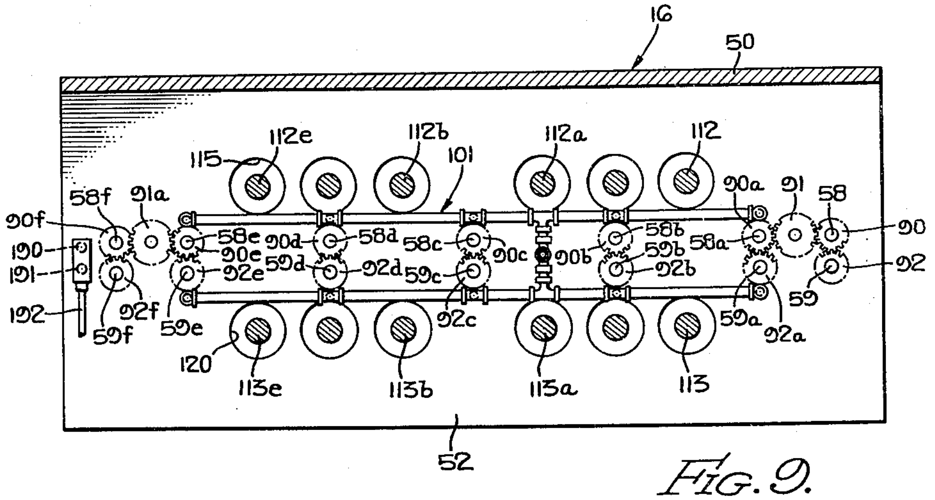
FIG. 9 is a sectional view taken substantially on the line 9—9 of FIG. 4.
Figure 10:
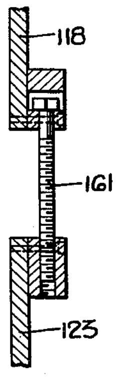
FIG. 10 is a sectional view taken substantially on the line 10—10 of FIG. 2.

The other end of the shaft **58*a* is provided with a gear 90*a* which engages with an idler gear 91 which in turn engages with a gear 90 on the shaft 58, thus driving said shaft (see FIG. 9). The gear 90 also engages with a gear 92 on the shaft 59 to drive that shaft in the direction of the arrow of FIG. 2. The gear 90*a* also engages with a gear 92*a* on the shaft 59*a* to drive that shaft in the same direction. A similar arrangement of gear 90*f* on shaft 58*f*, idler gear 91*a*, gear 90*e* on shaft 58*e*, gear 92*e* on shaft 59*e* and gear 92*f* on shaft 59*f* drives the shafts 58*f*, 59*e* and 59*f* in the directions of the arrows of FIG. 3. A gear 90*b* on shaft 58*b* drives a gear 92*b* on 59*b*, a gear 90*c* on shaft 59*c* drives a gear 92*c* on shaft 59*c*, and a gear 90*d* on shaft 58*d* drives a gear 92*d* on shaft 59*d*** to complete the means for driving the rolls in the directions of the arrows of FIG. 3.

Figure 6:
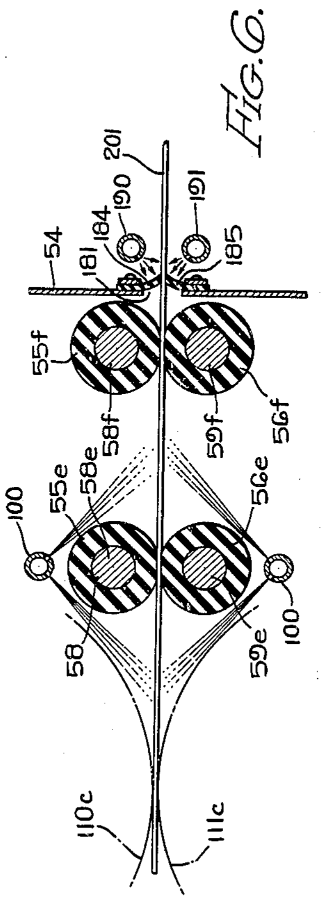
FIG. 6 is an enlarged fragmentary vertical sectional view illustrating details of the washing and drying apparatus.
Figure 4:
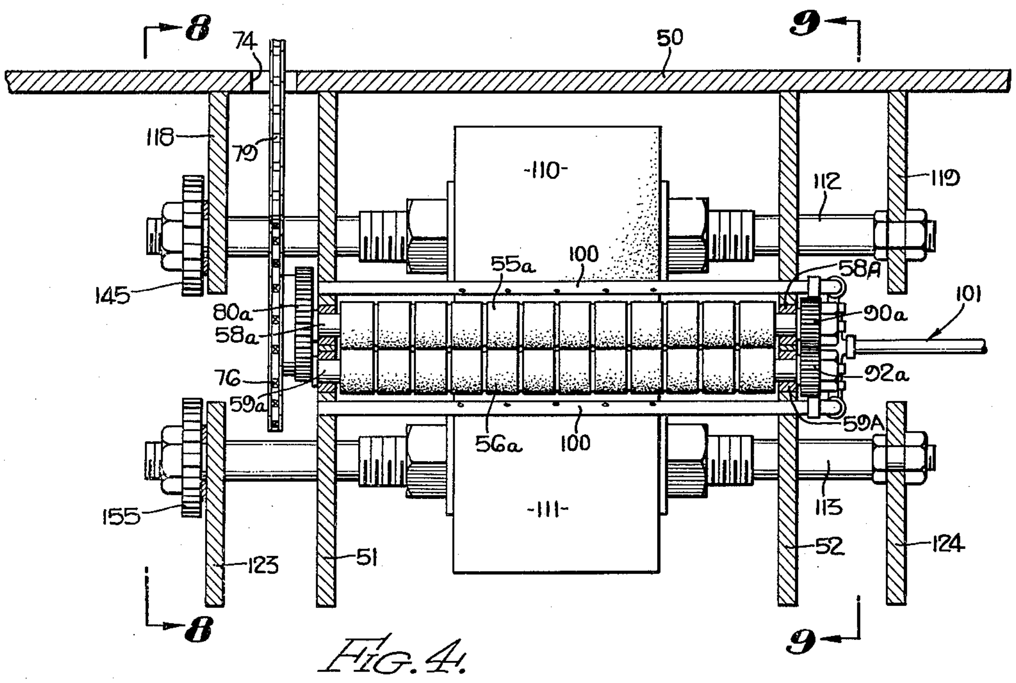
FIG. 4 is a sectional view taken substantially on the line 4—4 of FIG. 2.
Figure 5:
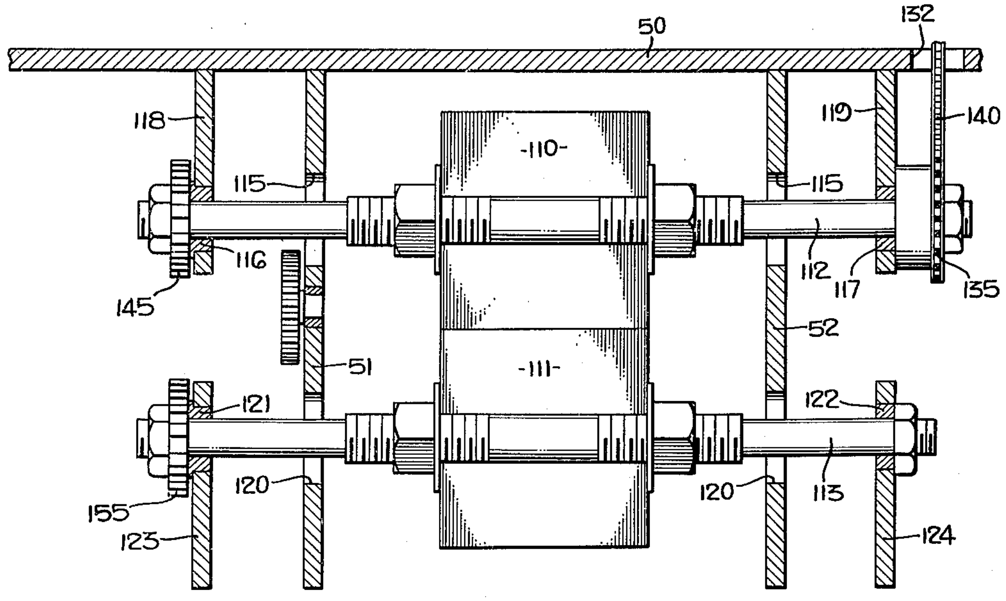

Means are provided for softening the record labels during the travel thereof through the housing and as shown in the drawings these means may include a plurality of longitudinally perforated water spray pipes 100 mounted transversely of the housing above and below the rolls as shown in FIG. 3 and FIG. 6. The system of pipes generally indicated 101 in FIG. 9 supplies water to the spray pipes. The water and label particles fall into a drain pan 105 and through the outlet 106 into a surge tank 107 provided with a filter 108.

Abrasion means are provided for removing the softened labels from the records and as shown these means may include a plurality of pairs of cylindrical wire brushes **110–110*c* and 111–111*c*, the brushes of each pair being axially aligned in a common vertical plane and cooperating together to form a bite between which the records are passed by the driving rolls described above. The rolls are detachably mounted on shafts 112–112*c* and shafts 113–113*c* respectively. The shafts 112–112*c* extend through apertures 115 in the side walls 51 and 52 and are journalled in bearings 116 and 117 in side plates 118 and 119, respectively, secured to the top wall 50. The shafts 113–113*c* extend through apertures 120 in the side walls 51 and 52 and are journalled in bearings 121 and 122 in side plates 123 and 124**, respectively.

Means are provided for driving the brushes in the directions of the arrows of FIG. 3 and at a speed of roughly 300–400 r.p.m. As shown in the drawings, these means may include the relatively large sprockets 130 and 131 keyed to the shafts 63 and 69 and operating above openings 132 and 133, the sprockets being connected in driving relationship to the relatively small diameter sprockets 135 and 136 keyed to shafts 112 and **112*c* by means of chain transmissions 140 and 141 respectively. A driving gear 145 is keyed to the shaft 112 on the end remote from the sprocket 135 and engages an idler gear 146 which in turn engages a gear 145*a* on the shaft 112*a*. Similarly, a driving gear 145*c* is keyed to the shaft 112*c*, engaging an idler gear 146*a* which in turn engages a gear 145*b* on the shaft 112*b***.

The lower set of brushes **111–111*c* is driven by means of a pair of idler gears 150 and 151 adjustably mounted on the plate 118 as will be described in detail below. The gear 150 engages with the gear 145 and with a gear 155 keyed to the shaft 113, the gear 155 being engaged with an idler gear 156 which in turn engages a gear 155*a* on the shaft 113*a*. The gear 151 engages with the gear 145*c* and with a gear 155*c* on the shaft 113*c*, the gear 155*c* engaging an idler gear 156*a* which in turn engages a gear 155*b* on the shaft 113*b***.

Figure 8:
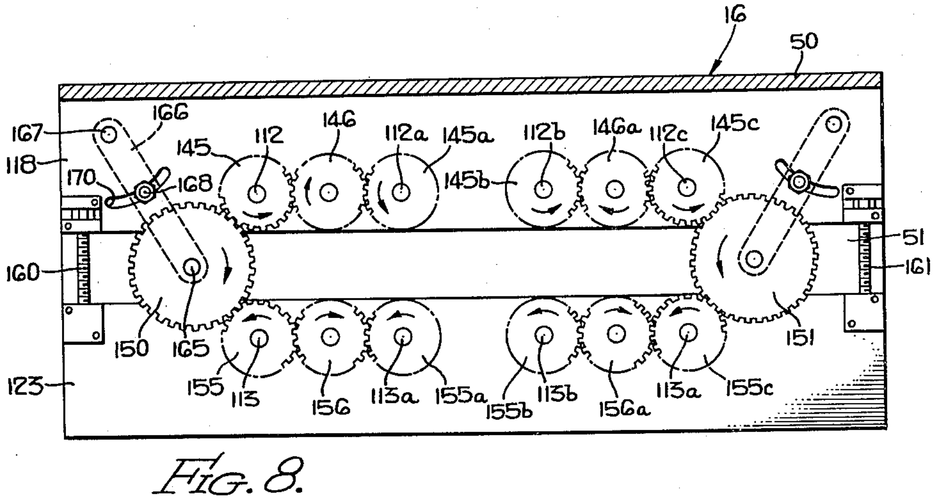
FIG. 8 is a sectional view taken substantially on the line 8—8 of FIG. 4.

Means are provided for adjusting the vertical spacing between the brushes **110–110*c* and the corresponding brushes 111–111*c*. As shown in the drawings, the plates 118 and 123 are maintained in spaced relation by means of jack screws 160 and 161 interconnecting the plates at each end thereof. A similar pair of jack screws (not shown) is provided for the pair of plates 119 and 124. The roller gear 150 is keyed to a stub shaft 165 carried on the end of an arm 166 which is pivoted to the plate 118 by means of a pin 167, the arm being locked in various positions by means of a bolt 168 passed therethrough and through an arcuate groove 170 in the plate 118. Identical adjustable support means are provided for the idler gear 151** as shown in FIG. 8.

Means are provided for sealing the housing against splashing of water therefrom and for drying the de-labeled records. As shown best in FIGS. 3 and 6 these means include horizontal slits 180 and 181 in the end walls. The slit 180 is provided with a flexible closure comprising a pair of rubber strips 182 and 183 which deflect as shown to permit entry of a record into the house. Similarly, the slit 181 is provided with a pair of rubber strips 184 and 185 which deflect as shown in FIG. 6 to permit a record to exit from the housing, the strips functioning in the manner of a "squeegee" to wipe water from the surfaces of the record. Mounted immediately adjacent the strips exteriorly of the housing is a pair of perforated air blast pipes 190 and 191, air under pressure being delivered thereto through a conduit 192.

In operation of the machine thus described, the records to be de-labeled are preferably pre-soaked in water for 20 minutes or more to soften the labels. This pre-soaking is not essential, but it is desirable since it permits a wider spacing of the brushes than would otherwise be possible, thus prolonging the effective life of the brushes. A stack 200 of the pre-soaked records 201 is placed on the feeding unit 15 in the position shown in FIGS. 1 and 2. The phantom lines of FIG. 1 illustrate the varying sizes of records which can be accommodated in the machine.

The endless chain conveyors 24 and 25 are set into operation, either before or after the stack of records is deposited in the position shown, and the feeder assembly automatically feeds the records, one by one, through the slit 180 in the end wall 53 and thence into the interior of the de-labeling unit 16. As will be apparent from an inspection of FIG. 2, this automatic feeding is accomplished through the cooperation between the pairs of hook members 40 and the stop members 36 and 37. As shown, the hook members push the lowermost record out from under the stack, the stop members preventing removal of all but said lowermost record.

The record 201, immediately upon entry of the leading edge thereof, is contacted by the pair of rolls 55 and 56 and drawn thereby between and through the bite formed by the rolls. The label areas 205 (both top and bottom) of the record are simultaneously drenched with water from the first pair of spray pipes 100. The record is then drawn by the succeeding pairs of rolls through each set of brushes, the label areas being thoroughly soaked at each pair of brushes by means of the succeeding pairs of spray pipes 100. The brushes, rotating in the directions of the arrows of FIG. 3, exert a continual abrasive action against the surfaces of the labels, the path of travel of the brushes being indicated by the phantom lines of FIG. 7. By the time the record has passed between the last pair of brushes 110*c* and 111*c*, the labels have been completely removed, the run-off water and the bits of paper from the labels falling by gravity into the pan 105 and thence into the surge tank 107 wherein the paper is filtered from the water.

The rolls 55*e*, 56*e*, 55*f* and 56*f* convey the de-labeled records through the slit 181 wherein the rubber strips 184 and 185 remove most of the surface moisture from the records. Final drying is accomplished by the air blast through the pipes 190 and 191.

The apparatus of the present invention provides a quick and inexpensive means for automatically removing the labels. It has been found that, while the abrasive, tearing action of the wire brushes is adequate to cleanly remove the labels, it has no, or substantially no effect upon the plastic material of the record itself, so that there is no appreciable loss of the valuable plastic material.

Having fully described my invention, it is to be understood that I do not wish to be limited to the details herein set forth, but my invention is of the full scope of the appended claims.

I claim:

1. Apparatus for removing paper labels from phonograph records, comprising: a feeding unit adapted to receive a stack of records and to feed successive records individually from the bottom of said stack in a horizontal direction; a de-labeling unit positioned in horizontal alignment with said feeding unit to receive said individual records successively; a plurality of pairs of driving rolls mounted in said de-labeling unit on opposite sides of a plane in horizontal alignment with the path of travel of records from said feeding unit, said pairs of driving rolls being respectively spaced from each other and from said feeding unit a distance less than the diameter of said records to positively convey said records through said de-labeling unit at a fixed rate of speed; opposed cylindrical wire brushes mounted in pairs in said de-labeling unit between adjacent upper and lower rolls of said pairs of driving rolls; means for rotating said wire brushes in opposite directions at peripheral speeds substantially greater than said fixed rate of speed to act in opposite directions on the labels applied to said records without interfering with the passage of said records through said machine at said fixed rate of speed; water pipes disposed above said upper driving rolls and below said lower driving rolls and each incorporating means for directing water onto the surface of the records at either side of the respective driving roll to soften the labels on the respective surfaces; and sealing means mounted in said de-labeling unit and positioned to wipe opposite sides of each record fed therefrom.

2. The apparatus of claim 1 wherein each of said wire brushes rotates in a clockwise direction as viewed from one side of the de-labeling unit at speeds on the order of 300–400 r.p.m.

References Cited in the file of this patent

UNITED STATES PATENTS

| | | |
|---|---|---|
| 893,063 | Evans | July 14, 1908 |
| 1,444,207 | Penfield | Feb. 6, 1923 |
| 1,462,512 | Loew | July 24, 1923 |
| 1,953,352 | Kranich | Apr. 3, 1934 |
| 2,044,041 | Wynne | June 16, 1936 |
| 2,158,694 | Fenton | May 16, 1939 |
| 2,181,266 | Durup | Nov. 28, 1939 |
| 2,313,606 | Webb | Mar. 9, 1943 |
| 2,359,088 | Croft | Sept. 26, 1944 |
| 2,697,528 | Bishop | Dec. 21, 1954 |
| 2,718,895 | Thomas | Sept. 27, 1955 |